May 26, 1959 K. GEBELE 2,887,940
PHOTOGRAPHIC SHUTTER
Filed May 11, 1955 2 Sheets-Sheet 1
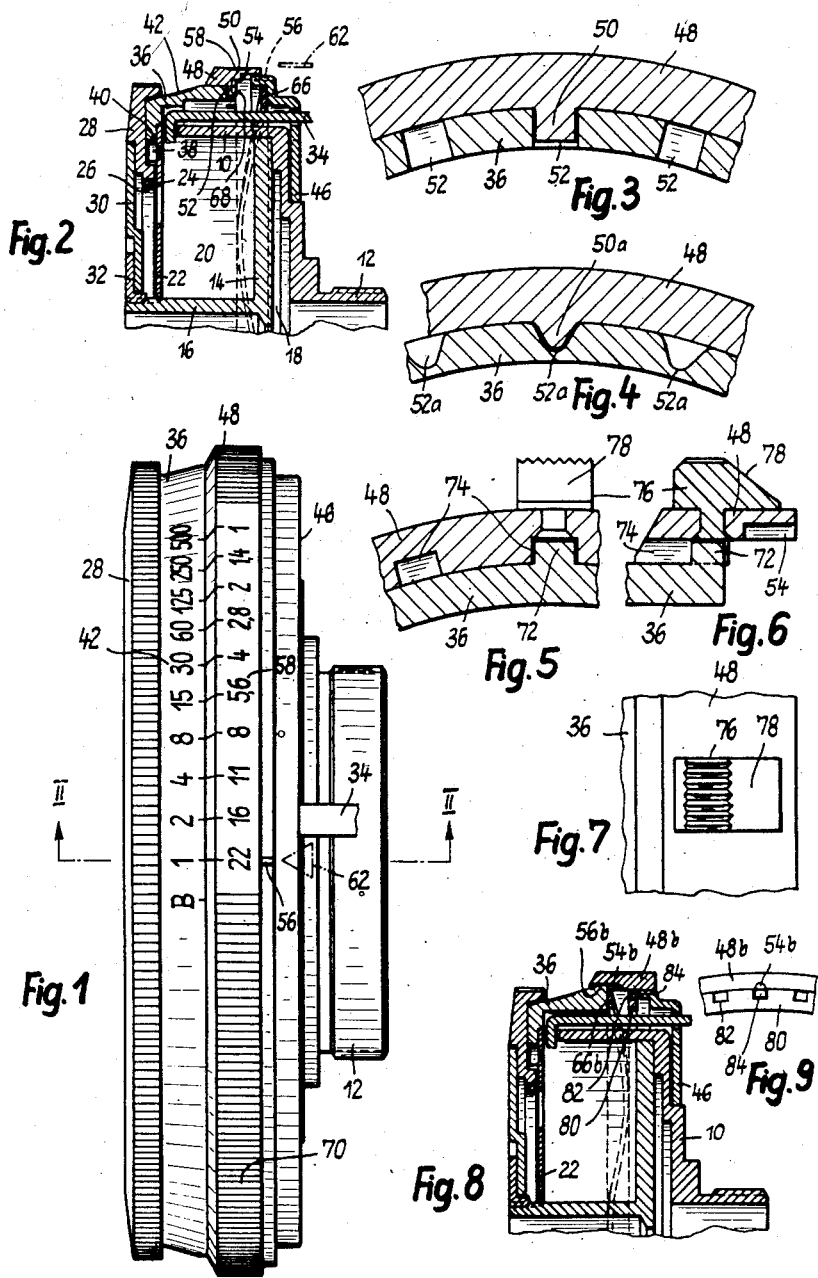

United States Patent Office 2,887,940
Patented May 26, 1959

2,887,940

PHOTOGRAPHIC SHUTTER

Kurt Gebele, Munich, Germany, assignor to Hans Deckel, Munich-Solln, Germany, and Friedrich Wilhelm Deckel, Zug, Switzerland Application May 11, 1955, Serial No. 507,703

Claims priority, application Germany May 19, 1954

13 Claims. (Cl. 95—64)

This invention relates to a photographic shutter of the type comprising a movable time setting or speed setting member, and a movable diaphragm aperture setting member, and coupling means connecting these two setting members to each other for conjoint movement to vary the exposure time and diaphragm aperture in a complementary manner.

An object of the present invention is to provide a generally improved and more satisfactory shutter of this kind.

Another object is the provision of improved coupling means for coupling the speed setting member to the diaphragm setting member in various possible positions of relative adjustment.

Still another object is the provision of coupling means of simple form which can be adjusted easily by one hand of an operator, and having a compact arrangement capable of use when the shutter is in a recessed mounting in the associated camera.

A further object is the provision of coupling means of sturdy construction not likely to get out of order, of such simple form that it may be made inexpensively, and of relatively neat and attractive appearance.

These and other desirable objects may be attained in the manner disclosed as an illustrative embodiment of the invention in the following description and in the accompanying drawings forming a part hereof, in which:

Fig. 1 is a top plan view or edge view of a photographic shutter in accordance with one embodiment of the present invention;

Fig. 2 is a fragmentary axial radial section through the same, taken approximately on the line II—II of Fig. 1;

Fig. 3 is a fragmentary cross section taken perpendicular to the optical axis of the shutter, through a portion of a shutter speed setting member and a coupling member, illustrating the relationship of these parts according to one embodiment of the invention;

Fig. 4 is a view similar to Fig. 3 illustrating an alternative form of the invention;

Fig. 5 is a view similar to Figs. 3 and 4 illustrating a third embodiment of the invention;

Fig. 6 is an axial radial section through a portion of Fig. 5;

Fig. 7 is a fragmentary plan of the parts shown in Figs. 5 and 6;

Fig. 8 is a view similar to Fig. 2 illustrating still another another embodiment of the invention;

Fig. 9 is a fragmentary elevational view of certain parts shown in Fig. 8; and

The same reference numerals throughout the several views indicate the same parts.

Figure 10:
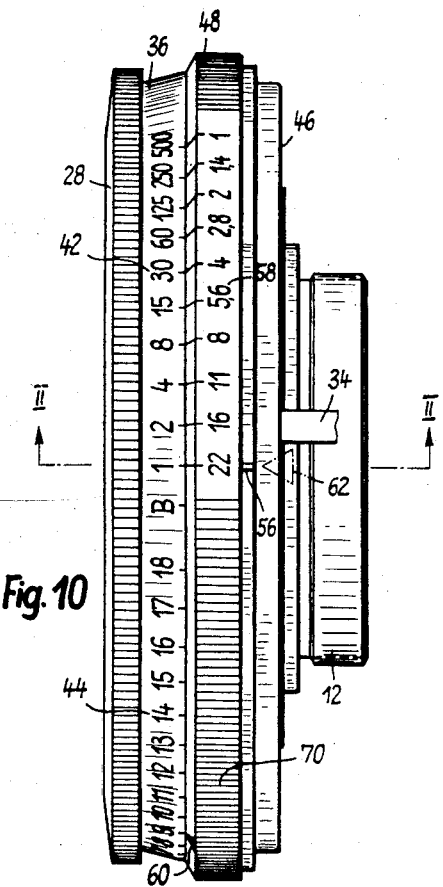
Fig. 10 is a view similar to Fig. 1 showing another embodiment of the invention.

Referring first to Figs. 1 and 2, there is shown a photographic shutter including a casing 10 to the conventional generally cylindrical shape, carrying the rear lens tube 12 projecting rearwardly from the rear wall of the shutter and serving not only for mounting the rear lens component placed within this tube, but also for mounting the shutter itself on the body of the associated camera with which it is used. Within the casing 10 is a base plate 14 having a front lens tube 16 formed thereon, the usual front component of the lens being mounted within this tube. The shutter blades as well as the iris diaphragm leaves, both of known form, are mounted in known manner within the space 18 between the base plate 14 and the rear wall of the shutter casing 10. The annular space 20 within the shutter casing contains the usual shutter driving means of any suitable known construction and mode of operation, many possible forms of such driving means being well understood in the art. For example, the iris diaphragm leaves, the shutter blades, and the driving means for driving the blades in their opening and closing movements, may be constructed substantially as shown in the Deckel and Geiger U.S. Patent 1,687,123, dated October 9, 1928.

Arranged near the front of the annular space 20 of the shutter is the internal shutter speed setting ring or exposure time control ring 22 mounted for rotation on the front lens tube 16. A lug 24 projecting forwardly from the internal speed setting ring 22 engages in a recess 26 in the external speed setting ring 28 which is rotatable at the front of the shutter, so as to couple the rings 22 and 28 to each other for conjoint rotary movement. The ring 28 is held in place by the stationary annular cover plate 30 which in turn is retained by a screw threaded ring 32 threaded onto the forward end of the front lens tube 16. The shutter timing or speed adjusting rings 22 and 28 correspond substantially to the speed adjusting ring 63 of said Deckel and Geiger patent, except that in the present instance there are two separate rings 22 and 28 coupled to each other to turn together, instead of the single integral adjusting ring 63 in said patent.

The shutter is provided with the usual shutter tensioning or cocking member, and the usual shutter trigger or release member, but in this instance the two members are bent to the rear so as to project from the back of the shutter where they may be operated by suitable mechanism built into the body of the camera on which the shutter is mounted. The shutter trigger or release member is not shown, but the shutter tensioning or cocking member is indicated fragmentarily at 34, bent to extend out the back of the shutter as above mentioned. This member may correspond in general to the shutter tensioning member 6 of said Deckel and Geiger patent.

The shutter is provided with a somewhat cup-shaped annular ring 36 surrounding the stationary side wall of the shutter, the outer surface of this ring being mainly beveled or conical as seen in Figs. 1 and 2. At the forward end of the ring is a front flange extending radially inwardly, underlying a portion of the ring 28 and projecting into the space between the ring 28 and the ring 22. A driving pin 38 on the member 22 projects into a small recess 40 formed in the ring 36, thus coupling the ring 36 to the speed control member 22 just as the ring 28 is likewise coupled to the same, so that the three members 22, 28, and 36 all turn together as a unit, about the optical axis of the shutter as a center. The beveled or conical surface of the ring 36 carries the shutter speed setting scale 42, having suitable graduations.

The diaphragm leaves within the space 18 of the shutter may be set or adjusted to different diaphragm aperture settings by turning the ring 46 mounted for rotation adjacent the rear surface of the shutter casing and operatively connected to the diaphragm leaves in known manner.

In applicant's copending United States patent application filed November 2, 1953, Serial No. 389,775, now Patent No. 2,829,574, issued April 8, 1958, there are disclosed various arrangements for coupling the speed setting member of a photographic shutter to the diaphragm aperture setting member, in accordance with an integrated exposure value scale or total exposure value scale, so that the shutter speed and the diaphragm aperture may be simultaneously adjusted in a complementary manner, by a single operating movement. Said copending application also fully explains that when these parts are to be coupled with each other, the shutter speed scale and the diaphragm setting scale should be so related to each other that a given angular movement of the diaphragm aperture setting member in one direction produces an effect complementary to that produced by the same angular movement of the shutter speed setting member in the same direction. The present invention may be considered as an improvement upon the coupling means disclosed in said copending application, and presupposes that the respective setting members of the present shutter are likewise arranged to operate in the same complementary manner disclosed in said copending application.

In the improvement of the present invention, a coupling ring 48 is provided, extending circumferentially around the shutter, coaxially with the optical axis of the shutter and with the two setting members 22 (for shutter speed) and 46 (for diaphragm aperture), this coupling ring 48 being slidable in an axial direction on the cylindrical rear portion of the periphery of the ring 36. This coupling ring 48 has formed therein a radially inwardly projecting coupling tooth 50 (see Fig. 3), or several such teeth if desired, which tooth (or teeth) is adapted to engage in any one of a plurality of coupling notches or slots or recesses 52 of complementary shape, formed in the rear end face of the graduated ring 36. Near the rear edge of the ring 48 is a driving tooth 54 extending in an axial direction and engaging in an axial groove 56 in the diaphragm aperture setting ring 46, which ring is cup-shaped and extends forwardly at its outer edge to underlie the rear edge of the ring 48 as shown. Suitable slots are formed in the member 46, to enable the shutter tensioning and release members to pass through. Through the parts 54, 56, the coupling ring 48 remains always coupled in predetermined position or orientation with respect to the diaphragm setting ring 46, but it may be uncoupled from the speed setting ring 36 and coupled to the speed setting ring again in a different position of orientation, by moving the ring 48 rearwardly to disengage the driving tooth 50 from one of the recesses 52, then turning the coupling ring 48 to a different position of orientation and moving it forwardly again to engage the tooth 50 in a different one of the recesses 52.

The diaphragm aperture setting scale or f stop scale is arranged on the periphery of the coupling ring 48 as shown at 58 in Fig. 1. As already implied, the angular intervals of successive graduations of the diaphragm aperture scale are the same as the angular intervals of successive graduations of the shutter speed scale 42, and read in a complementary manner, as shown. Both scales are read in conjunction with a fixed reference index or pointer indicated diagrammatically at 62, which in actual practice is usually placed on some suitable stationary part of the photographic camera on which the shutter is mounted.

Interposed between the ring 46 and the ring 48 is an annular spring 66 of wavy shape, which abuts against and reacts against a forwardly facing shoulder on the diaphragm setting ring 46, and a rearwardly facing shoulder 68 on the coupling ring 48, thus tending constantly to move the coupling ring 48 forwardly to keep the tooth 50 engaged in one of the recesses or notches 52. The diaphragm setting ring 46 is held against rearward movement by any suitable part of the shutter or the associated camera. Rotation of the coupling ring 48 is facilitated by knurling or serrations 70 on the periphery of the ring, except on the portion thereof which carries the aperture scale 58, where such serrations may be omitted if desired.

With this construction, the setting of the coupling mechanism in accordance with any desired relationship between shutter speed and diaphragm aperture is very easy. The operator is able to place one hand across the front of the shutter, with the tips of the fingers engaging the ring 48. The fingers may then press rearwardly on the ring 48, moving it slightly rearwardly against the force of the spring 66, to disengage the tooth 50 from the particular notch or recess 52 in which it is seated, whereupon the ring 48 may be turned in one direction or the other to bring the tooth 50 opposite another one of the recesses 52. Pressure is then released, and the spring 66 moves the ring 48 forwardly to seat the tooth 50 in the appropriate recess 52 with which it has been alined. The particular setting or position of orientation at which the members are coupled to each other, is determined either by estimation or by a suitable light meter. The respective scales of speed and aperture may be read in conjunction with the index mark or reference point 62, while making the coupling setting, and thereafter the coupled adjusting members may be rotated as desired, either by means of the ring 28 or by means of the ring 48 since they are coupled together and rotate as a unit.

As an example, Fig. 1 shows the shutter speed set for an exposure of one second and the diaphragm set for $f{:}22$. If the rings as thus coupled are then rotated, for example, in a clockwise direction (viewed from the front of the shutter) through a space of two graduations, the shutter will then be set for an exposure of ¼ of a second at a diaphragm aperture of $f{:}11$. Any other desired pair of values is quickly available by turning either the member 28 or the member 48, without disturbing the coupling between them, so long as the light value remains the same. But if the light value changes, or if the coupling should be changed for any other reason (e.g., when a filter is applied to the lens) then a new coupling is quickly available by pressing rearwardly on the ring 48 and turning it in one direction or the other without turning the ring 28, to effect coupling in a new position of orientation.

Referring now to Fig. 4, it will be seen that the coupling tooth and complementary recesses or notches need not be of the square or rectangular form shown in Fig. 3, but may be of the tapered, curved, or cam-like formation illustrated in Fig. 4, where the coupling tooth is shown at 50a and the notches or recesses are shown at 52a.

In the further modification shown in Figs. 5–7, the coupling tooth 72 is formed on the member 36 rather than on the member 48, and the notches or recesses 74 for receiving this tooth are formed on the member 48 rather than the member 36.

Another possible modification is also shown in these Figs. 5–7, in that the serrations 70 are omitted from the periphery of the ring 48, and in place of them a special handle or grip member 76 is provided on the ring 48, riveted or otherwise secured thereto. This handle or grip member 76 is disposed on a part of the periphery which is not occupied by the diaphragm scale 58, so does not interfere with the diaphragm scale. The handle 76 has an inclined or beveled rear face 78 so that the user's fingers, when engaged with this face 78, will tend to exert a forward component of pressure keeping the teeth and notches of the respective rings 36 and 48 firmly engaged with each other and avoiding any accidental tendency to disengage them, although they may be purposely disengaged by pushing rearwardly on the vertical front face of the handle 76.

In Figs. 8 and 9 there is illustrated still another modification of the invention, in which the coupling ring is in fixed position of orientation with respect to the speed ring 36, and is adjustable to various positions of orientation with respect to the diaphragm ring 46. The coupling ring is here indicated by the numeral 48b, and is coupled with the ring 36 (although axially slidable with relation thereto) by means of a groove 54b formed in the inner periphery of the ring 48b, engaged by a lug or key portion 56b on the ring 36. The coupling ring 48b has an internal flange 80 extending radially inward in a plane between the front and rear edges of the ring 48b, which flange 80 is provided with a series of recesses or notches 82, any one of which may be engaged by the coupling tooth 84 projecting forwardly from the edge of the diaphragm setting member 46.

In this embodiment, the annular wavy spring 66b is mounted between the rear face of the ring 36, and the flange 80, thus tending to press the coupling ring 48b rearwardly rather than forwardly. The coupling is altered by pulling the coupling ring 48b forwardly against the action of the spring 66b, thereby disengaging the tooth 84 from the recess 82, then rotating the coupling ring together with the rings 28 and 36 until a different one of the recesses 82 comes opposite the tooth 84 on the diaphragm setting ring 46, whereupon the coupling ring is again allowed to move rearwardly under the influence of the spring 66b, to effect the new position of coupling. In other respects, this embodiment of the invention may be the same as previously described in connection with Figs. 1 and 2.

Still another embodiment of the invention is illustrated in Fig. 10. This embodiment is the same as that illustrated in Fig. 1, except that in addition to the diaphragm aperture scale 58 and the shutter speed scale 42, it also carries a light value scale or integrated exposure value scale 44 engraved on the ring 36 to one side of the scale 42, and read in conjunction with a reference point or index mark 60 on the ring 48. As is fully explained in said copending patent application, this integrated exposure value scale 44 may be used very conveniently in adjusting the shutter for any particular condition of illumination, film sensitivity, and filter factor, to produce the proper relationship of shutter speed to diaphragm aperture, but without regard to the absolute values of either shutter speed or diaphragm aperture.

The coupling means of the present invention is neat and attractive, and in accordance with modern concepts of pleasing shutter design, so that it does not detract from the appearance of the shutter, nor does it result in protruding or unsightly parts. At the same time, the coupling may be easily and quickly adjusted and operated as desired, and it is also accessible even when the shutter is recessed or partly recessed into the front of the camera on which it is mounted, since only a slightly annular space around the ring 48 is needed for the fingers of the operator.

Any of the various forms of coupling means disclosed herein may be used with the graduated scale arrangement disclosed in applicant's companion U.S. patent application filed May 23, 1955, Serial No. 510,299.

It is seen from the foregoing disclosure that the above mentioned objects of the invention are well fulfilled. It is to be understood that the foregoing disclosure is given by way of illustrative example only, rather than by way of limitation, and that without departing from the invention, the details may be varied within the scope of the appended claims.

What is claimed is:

1. A photographic shutter including a casing having an optical axis passing through the casing, a shutter speed adjusting member rotatable about said axis for setting the shutter to make exposures of different speeds and fixed against movement relative to said casing in an axial direction, a diaphragm aperture adjusting member also rotatable about said axis and fixed against movement relative to said casing in an axial direction, a tubular coupling ring extending circumferentially around said shutter casing substantially coaxial with said axis and mounted for both circumferential turning movement and axial movement with respect to said casing, said coupling ring being telescopically mounted on one of said adjusting members, for axial movement relative to the member on which it is mounted, a driving connection between said ring and one of said adjusting members for holding said ring and said one of said adjusting members in fixed position of orientation with respect to each other notwithstanding rotary movements or axial movements of said ring, and a disengageable driving connection between said ring and the other of said adjusting members to enable said ring to be coupling to said other of said adjusting members in a variety of positions of orientation, said disengageable connection being disengaged by axial movement of said ring in one direction and being engaged by axial movement of said ring in the opposite direction.

2. A construction as defined in claim 1, in which said disengageable driving connection includes a driving tooth, a plurality of recesses in any one of which said driving tooth may be seated, and a spring tending to keep said tooth seated in one of said recesses.

3. A photographic shutter including a casing having an optical axis passing through the casing, a shutter speed adjusting member rotatable about said axis for setting the shutter to make exposures of different speeds, a diaphragm aperture adjusting member also rotatable about said axis, said adjusting members both being of ring-like form and both being held against axial movement relative to said casing, a tubular coupling ring extending circumferentially around said shutter casing substantially coaxial with said axis and mounted for both circumferential turning movement and axial movement with respect to said casing, a permanent rotary driving connection between said ring and one of said adjusting members, said ring being telescopically mounted on said one of said adjusting members, and a disengageable and adjustable driving connection between said ring and the other of said adjusting members.

4. A photographic shutter including a casing having an optical axis passing through the casing, a shutter speed adjusting member rotatable about said axis for setting the shutter to make exposures of different speeds, a diaphragm aperture adjusting member also rotatable about said axis, said adjusting members both being of ring-like form and both being held against axial movement relative to said casing, a tubular coupling ring extending circumferentially around said shutter casing substantially coaxial with said axis and mounted for both circumferential turning movement and axial movement with respect to said casing, a permanent rotary driving connection between said ring and one of said adjusting members, said ring being telescopically mounted on said one of said adjusting members, and means operated by axial movement of said ring for uncoupling said ring from and coupling it nonrotatably to the other of said adjusting members in various adjusted positions of orientation with respect thereto.

5. A construction as defined in claim 3, in which said coupling ring is provided with serrations on at least the major circumferential extent of its periphery.

6. A construction as defined in claim 3, in which said coupling ring carries a diaphragm aperture scale on a minor circumferential extent of its periphery and is provided with serrations on at least a substantial part of the remaining circumferential extent of its periphery.

7. A construction as defined in claim 3, in which said coupling ring is provided with a setting knob projecting from its periphery.

8. A construction as defined in claim 7, in which said setting knob has a bevelled face ascending in the direction of coupling movement of said ring relative to said other of said adjusting members.

9. A photographic shutter including a casing of generally annular form and having a forward lens tube, a diaphragm aperture adjusting member rotatably mounted with respect to said casing, a shutter speed adjusting member also rotatably mounted with respect to said casing, and a coupling ring operatively connected to both of said adjusting members to couple them to each other for conjoint rotary movement, said coupling ring being mounted for axial movement with respect to both of said adjusting members and being so arranged with respect to said adjusting members that axial movement of said coupling ring in one direction operatively disconnects said ring from one of said members so that said two adjusting members may be oriented to a different position with respect to each other and may be operatively connected to each other in the new position of orientation by moving said coupling ring axially in the opposite direction.

10. A construction as defined in claim 9, further including an annular wavy spring surrounding said casing and pressing against said coupling ring in a direction tending to keep it operatively connected to both of said adjusting members.

11. A photographic shutter including a casing of generally annular form and having a forward lens tube, a diaphragm aperture adjusting member rotatably mounted adjacent the rear of said casing and having a peripheral edge extending outwardly beyond the circumference of said casing, an annular shutter speed control member rotatably mounted on said forward lens tube adjacent the front of said casing, a shutter speed adjusting member of annular form having an outer edge of larger diameter than the outer diameter of said speed control member and an inner edge of smaller diameter than the outer diameter of said control member and lying forwardly of and in overlapping relation to said control member, a rotary driving connection between said speed control member and said speed adjusting member, an annular cover plate surrounding said lens tube and overlying a portion of said speed adjusting member, a member of generally tubular formation surrounding said casing and connected to said speed adjusting member and extending rearwardly therefrom toward said aperture adjusting member, and means operatively connecting said tubular member and said aperture adjusting member to each other to turn together, said connecting means being adjustable to connect said aperture adjusting member to said tubular member in any one of a series of different positions of orientation with respect to each other.

12. A construction as defined in claim 3, in which said coupling ring is disengaged from said other one of said adjusting members by axial movement in a direction away from said other member and is operatively coupled thereto by axial movement in a direction toward said other member, and in which spring means tends to move said coupling ring axially in a coupling direction toward said other member.

13. A construction as defined in claim 12, in which said coupling ring entirely surrounds said shutter in a circumferential direction and is the outermost member of the shutter unit in a radial sense and has a milled cylindrical outer surface of sufficient axial extent for easy grasping by fingers of a user.

References Cited in the file of this patent

UNITED STATES PATENTS

| | | |
|---|---|---|
| 883,607 | Andrews | Mar. 31, 1908 |
| 2,194,031 | Riszdorfer | Mar. 19, 1940 |
| 2,590,161 | Dorsey | Mar. 25, 1952 |
| 2,596,328 | Dorsey | May 13, 1952 |
| 2,612,093 | Schutz | Sept. 30, 1952 |
| 2,716,930 | Marson | Sept. 6, 1955 |
| 2,829,574 | Gebele | Apr. 8, 1958 |

FOREIGN PATENTS

| | | |
|---|---|---|
| 303,088 | Germany | Jan. 18 1918 |
| 666,365 | Germany | Oct. 18, 1938 |
| 523,785 | Belgium | Nov. 14, 1953 |
| 1,090,214 | France | Oct. 13, 1954 |